United States Patent Office 3,317,592
Patented May 2, 1967

3,317,592
CATALYZED OXIDATION REACTIONS
Alexander F. MacLean and Adin L. Stautzenberger, Corpus Christi, Tex., assignors to Celanese Corporation, a corporation of Delaware
No Drawing. Filed Feb. 9, 1962, Ser. No. 172,075
7 Claims. (Cl. 260—533)

This invention relates to the oxidation of organic compounds. It more particularly refers to the oxidation of organic compounds using osmium tetroxide as the catalyst.

Oxidation of olefinic compounds to glycols by osmium tetroxide has long been known. It has also been reported that various oxidizing agents, such as peroxides, strong acids, perchlorates and permanganates, are useful in combination with osmium tetroxide for hydroxylating olefinic compounds to glycols.

Since osmium is a prohibitively expensive material, much work has been done on the recovery of osmium values from the oxidation product of the reactions discussed above. In this connection, it has been suggested that reduced osmium oxides and organic complexes of osmium can be absorbed on commercial alumina which has been strongly acidified. The absorbed osmium values are then oxidized to recreate osmium tetroxide. It has also been suggested that osmium dioxide can be oxidized to osmium tetroxide through the use of peroxides.

The various recovery and reactivation techniques for osmium values have the disadvantage that they must be practiced apart from the main oxidation process under consideration. That is, the spent reduced osmium values must be taken from the main oxidation process, reactivated, and then reintroduced into the main oxidation reaction either as a new stream or with make-up fresh osmium tetroxide catalyst feed. This separate reactivation step is an additional processing step which unnecessarily complicates what is basically a simple catalyzed oxidation process. This additional step further increases the cost of the oxidation product since greater capital equipment costs are associated with the separate reactivation of reduced osmium values than would be the case if osmium values could be regenerated in situ.

It is, therefore, an object of this invention to provide a novel oxidation process. It is another object of this invention to provide a novel osmium tetroxide catalyzed oxidation process. It is a further object of this invention to provide a novel oxidation process wherein the osmium tetroxide catalyst is continuously regenerated and reactivated during the course of the main oxidation process. It is still another object of this invention to provide an oxidation process whereby organic acids are produced. Further and additional objects will appear from a consideration of the remainder of this specification wherein all proportions are expressed as parts by weight or weight percent unless specified to the contrary.

In accord with and fulfilling these objects, this invention includes as one of its embodiments the oxidation of organic compounds to acids by oxygen in the presence of osmium tetroxide catalyst in alkaline environment. This invention includes, in another embodiment thereof, the regeneration and reactivation of reduced osmium values to osmium tetroxide catalyst by oxygen in alkaline environment. This invention also includes in still another embodiment thereof, the above noted reactivation of reduced osmium values in situ in the system undergoing oxidation catalyzed by osmium tetroxide.

The above embodiments of this invention may be carried out simultaneously. That is, advantage may be taken of a combination of the embodiments of this invention by oxidizing organic compounds to acids with oxygen in alkaline solution utilizing an osmium tetroxide catalyst while at the same time regenerating and reactivating the spent osmium catalyst values to osmium tetroxide in situ, or regenerating and reactivating said spent catalyst values by oxidation with oxygen in alkaline environment apart from the oxidation reaction chamber and mass.

Alternatively, osmium tetroxide catalyzed reactions other than the oxidation of organic compounds to acids can take advantage of in situ regeneration and reactivation of spent osmium catalyst according to this invention. Similarly, the oxidation of organic compounds to acids in alkaline solution utilizing osmium tetroxide catalyst can be carried out without necessarily regenerating and reactivating spent osmium catalyst values in situ.

More specifically, it has been found that soluble spent osmium catalyst is regenerated to osmium tetroxide in alkaline solutions having a pH from about 7.5 to 12, preferably 9 to 10, by molecular oxygen. The oxygen can suitably be in the form of air, pure oxygen or other oxygen containing gases. The osmium regeneration reaction can be carried out at about room temperature or higher under atmospheric or higher pressures. The preferred maximum temperature and pressure are those values at which it is possible to maintain oxygen available to the system. Oxygen is suitably bubbled through the alkaline solution of spent osmium catalyst at least at a rate high enough to saturate the system with oxygen. Since the rate of oxidation of spent osmium values to osmium tetroxide is dependent upon the amount of oxygen present, it is preferred to provide as high a concentration of oxygen as possible. Spent osmium catalyst solutions can be rendered suitably alkaline by the addition of sodium hydroxide, potassium hydroxide or the like.

The production of ethylene glycol by the oxidation of ethylene with molecular oxygen is a good example of the operation of this embodiment of this invention. It should be noted that the oxidation of ethylene to ethylene glycol is aided by increased pressure. Thus, as the pressure in the reaction system increases from about 1 atmosphere, the tendency to form osmic acid-glycol complexes decreases thereby permitting the osmium tetroxide catalyst to remain effective as an oxidation catalyst rather than become inaccessible through complex formation. Preferably, ethylene oxidation to ethylene glycol using an osmium tetroxide catalyst should be carried out at about 10 to 100 atmospheres pressure for best results.

It should be noted that the chemical compound being oxidized according to this invention can be introduced into the oxidizing system either by dissolving it in the catalyst solution or by mixing it with oxygen and bubbling it through the catalyst solution.

The following specific examples are not to be construed as limiting upon the scope of this invention since it will appear to those skilled in this art that the regeneration reaction is applicable to other osmium tetroxide catalyzed oxidations than ethylene.

*Example I*

An aqueous solution, 0.005 molar in osmium tetroxide, was charged to a stirred reactor and sufficient 0.1 normal sodium hydroxide was added thereto to bring the pH to 9.5. A gaseous mixture consisting of 2 parts by volume ethylene per part of oxygen was circulated over the aqueous solution with the reactor maintained at about 50° C. The gas was continuously absorbed and ethylene glycol was continuously built up in the aqueous solution. The pH of the solution was maintained by adding sodium hydroxide as required. The concentration of osmium tetroxide remained substantially constant during the course of the reaction indicating that the osmium catalyst was being regenerated simultaneously as it was becoming spent. This reaction was carried out in glass equipment at atmospheric pressure.

Example II

A reaction as in Example I was carried out in a type 304 stainless steel stirred reactor at 1000 p.s.i.g. Oxygen and ethylene at a volume ratio of about 9 to 1 respectively was passed into the reactor together with sodium hydroxide to maintain pH control at about 9.5. The reactor had a partial condenser thereon through which unreacted gaseous feed materials passed. After 3.75 hours, the ethylene glycol concentration had reached 2% at an ethylene efficiency of 95% and was still increasing as the experiment was terminated.

Example III

Reduced osmium tetroxide catalyst solution was regenerated and reactivated as follows:

Sodium osmate ($NaHOsO_4$), a reduced form of osmium tetroxide, was oxidized to osmium tetroxide at 30° C. by subjecting an equimolar concentration of sodium formate and sodium osmate (0.1 millimole) to oxygen at a pressure of 1 atmosphere and neutralizing the by-product sodium hydroxide formed with 0.1 normal sulfuric acid.

Example IV

An aqueous solution of 33 wt. percent dioxane and 0.17 wt. percent osmium tetroxide was used to oxidize 0.64 millimole of octene-1 to heptanoic acid at 70° C. under an oxygen atmosphere. The reaction proceeded for 183 minutes at which time 0.4 millimole of oxygen had been consumed. Caustic (0.36 mole) had been added during the reaction time to maintain the pH at between 8 to 8.5. The product solution was evaporated to dryness and then dissolved in dioxane and acidified with concentrated hydrochloric acid to a pH of 1. Gas chromatographic analysis indicated that heptanoic acid and formic acid were the only products and these corresponded to the stoichiometry of the caustic consumed.

The embodiment of this invention wherein organic compounds are oxidized to acids is particularly well suited to the oxidation of vicinal glycols, olefins, ketones and alcohols by osmium tetroxide catalysis in alkaline solution. In this embodiment oxidation can be effected either by osmium tetroxide alone or by a combination of osmium tetroxide and a strong oxidizing agent. It is necessary that the oxidation reaction to form acids be carried out under conditions such that there is a deficiency of the organic compound being oxidized. Thus, for example, where octene-1 is oxidized to n-heptanoic acid, the tendency is for the reaction to proceed more rapidly toward the formation of 1,2-octanediol rather than the formation of heptanoic acid. As the reaction proceeds, octene-1 is consumed to give 1,2-octanediol, and as the amount of octene-1 decreases, 1,2-octanediol begins to be oxidized. Thus, the reaction will proceed all the way to heptanoic acid and formic acid or other mono-carbon oxygenated product. It is also extremely important that the reaction be maintained alkaline, with a pH between about 7.5 and 12 being suitable. At the same time, excessive alkalinity tends to cause degradation of the acid product by reducing the number of carbon atoms in the acid backbone. Thus, the higher the alkalinity, the greater will be the variety of products produced by the oxidation of any given organic compound. It is, therefore, preferred to maintain the reaction at a pH of 8 to 9.5 for best results. This reaction can be carried out at temperatures of about 70 to 150° C. and oxygen pressures of the order of 50 to 1500 p.s.i.g.

Specifically, oxidations have been carried out according to this invention utilizing an aqueous solution of 0.17% osmium tetroxide and 33% dioxane rendered alkaline to a pH of 9.5 by sodium hydroxide addition and kept at this pH by continued addition as required. The reaction utilized 32 moles of octene-1 at 70° and 112 moles of oxygen which were passed over the above solution. The following product was produced in the yields (based upon octene-1 consumed) specified:

| | Percent |
|---|---|
| Heptanoic acid | 11.1 |
| Caproic acid | 18.6 |
| Valeric acid | 3.7 |
| Butyric acid | 8.5 |

Propionic, acetic and formic acid were analyzed to be present in significant quantities.

Similarly, nonanone-2 was oxidized to the same products as octene-1 under the same conditions although the yields varied somewhat. Likewise, oleic acid has been oxidized to azelaic and pelargonic acids; ethylene glycol has been oxidized to formic acid; n-propyl alcohol, n-butyl alcohol and n-octyl alcohol have been oxidized to their corresponding acids as the major reaction product.

It has been found to be helpful to include a solubilizer (that is, a material which renders the compound being oxidized soluble in the catalyst solution) in the oxidation reaction. While this is not essential to the practice of this invention, the use of a solubilizer is convenient. p-Dioxane, acetonitrile and t-butyl alcohol have been found to be good solubilizers and are exemplary of the group.

By combining the two embodiments of this invention, it is practical to oxidize an organic compound to an organic acid with oxygen in an alkaline solution using an osmium tetroxide catalyst and continually regenerate the catalyst as it becomes spent in the course of the reaction.

This specification has been given by way of example. Nothing contained herein should in any way be construed as limiting upon this invention.

We claim:
1. A process for continuously producing carboxylic acids which comprises:
 (a) providing an alkaline environment containing at least catalytic quantities of osmium tetroxide;
 (b) introducing an oxidizable organic compound selected from the group consisting of olefins, ketones and alcohols into said environment; and
 (c) introducing a molecular oxygen containing gas into said environment whereby said organic compound is oxidized to at least one carboxylic acid and said catalyst is continuously regenerated in situ.

2. A process as claimed in claim 1 wherein said alkaline environment is an aqueous solution having a pH of about 8 to 10.

3. A process as claimed in claim 1 wherein said organic compound and said oxygen containing gas are premixed in the gaseous state and introduced concurrently into said environment.

4. The process as claimed in claim 1 wherein a solubilizer selected from the group consisting of p-dioxane, acetonitrile and t-butyl alcohol is also incorporated in the reaction system.

5. The process of producing vicinal glycols which comprises oxidizing olefinic compounds with molecular oxygen in alkaline environment utilizing an osmium tetroxide catalyst.

6. The process as claimed in claim 5 wherein said olefinic compound is selected from the group consisting of ethylene and octene-1.

7. A process for producing ethylene glycol which comprises contacting ethylene with an aqueous solution comprising osmium tetroxide at a pH ranging from about 8 to 10 in the presence of molecular oxygen.

References Cited by the Examiner

UNITED STATES PATENTS

| 2,373,942 | 4/1945 | Bergsteinsson | 260—635 |
| 2,718,529 | 9/1955 | Smith et al. | 260—537 |

(Other references on following page)

OTHER REFERENCES

Hoffman: "Carrying Oxygen by Osmium Tetroxide and Activity of Chlorate Solutions," Berichte, vol. 45 (1912), pp. 3329–3336.

Medvedev et al.: "Oxidation of Unsaturated Acids As by Means of Chlorates in Presence of Osmium," Chem. Abst., vol. 22 (1928), pp. 3132–3.

Mellor: "Comprehensive Treatise on Inorganic and Theoretical Chemistry," vol. 15 (1936), p. 707.

Remy: "Treatise On Inorg. Chem.," vol. II, p. 330 (1956).

Solymosi et al.: "Osmium Tetroxide as General Catalyst For Oxidations in Alkaline Media," Chemist Analyst, vol. 49, No. 1 (1960), pages 12 and 13.

LORRAINE A. WEINBERGER, *Primary Examiner.*

CHARLES B. PARKER, *Examiner.*

S. B. WILLIAMS, G. P. D'ANGELO,
*Assistant Examiners.*